UNITED STATES PATENT OFFICE.

ALOIS DUBOUX, OF GRANDVAUX, AND CONSTANT HENRI RAPIN, OF LALEX, NEAR GRANDVAUX, SWITZERLAND.

CHEMICAL PRODUCT FOR PRESERVING EGGS.

1,019,614. Specification of Letters Patent. Patented Mar. 5, 1912.

No Drawing. Application filed September 23, 1911. Serial No. 650,986.

*To all whom it may concern:*

Be it known that we, ALOIS DUBOUX and CONSTANT HENRI RAPIN, both citizens of the Swiss Confederation, residing, the first at Grandvaux and the second at Lalex, near Grandvaux, Switzerland, have invented certain new and useful Improvements in Chemical Products for Preserving Eggs, of which the following is a specification.

This invention relates to a chemical compound designed to prevent the air or moistness from getting at eggs and to protect the eggs against the action of any agent adapted to alter or to decompose the egg so that the eggs preserve their natural and fresh taste.

The porosity of the egg-shell is one of the causes producing the more or less rapid alteration of the egg. If eggs are stored in a place which is not ventilated they get very quickly a bad taste and they further impregnate themselves with the smell of objects with which they come in contact. If the egg-shell is coated with the new chemical product the egg preserves all its qualities during a very long time.

The new chemical product is composed of:—magnesium silicate, vaseline, a small quantity of tannate of aluminium, and finely pulverized gum-dragon. These substances, which must be perfectly pure, are mixed together so as to form an unctuous paste which is unalterable when exposed to the air or to the light, which is tasteless, inodorous, almost insoluble in water and in alcohol, but easier soluble in ether. The compound melts at 37° C. This paste can be preserved almost indefinitely without getting rancid.

The eggs are coated with the paste and then placed into a wooden box to be stored in a well aerated and dry place.

We claim:—

A chemical product for preserving eggs consisting of magnesium silicate, vaseline, tannate of aluminium and gum-dragon, intimately mixed, so that they form an unctuous, unalterable, tasteless, and inodorous paste which is almost insoluble in water and in alcohol, but soluble in ether and which melts at 37° C., substantially as described and shown and for the purpose set forth.

In witness whereof we have hereunto set our hands in the presence of two witnesses.

ALOIS DUBOUX.
CONSTANT HENRI RAPIN.

Witnesses:
L. H. MUNIER,
F. VIELLIER.

Copies of this patent may be obtained for five cents each, by addressing the "Commissioner of Patents, Washington, D. C."